United States Patent [19]

Beaudry

[11] Patent Number: 4,720,921

[45] Date of Patent: Jan. 26, 1988

[54] NAVIGATIONAL INSTRUMENT

[76] Inventor: Eugene N. Beaudry, R.D. 2, Box 309, Hinesburg, Vt. 05461

[21] Appl. No.: 866,210

[22] Filed: May 22, 1986

[51] Int. Cl.⁴ .................... G01B 3/16; G01B 21/20
[52] U.S. Cl. ................... 33/457; 33/149 R; 33/152 B; 33/149 H; 33/1 C
[58] Field of Search ............ 33/152 B, 149 R, 149 H, 33/431, 457, 150, 1 C, 27.01, 27.02, 27.03, 152 R, 152 C, 152 D, 151, 149 B, 149 C

[56] References Cited

U.S. PATENT DOCUMENTS

| | | | |
|---|---|---|---|
| 376,379 | 1/1888 | Hanower | 33/152 R |
| 380,360 | 4/1888 | Spencer et al. | 33/150 |
| 3,365,802 | 1/1968 | Woods | 33/457 |
| 3,816,928 | 6/1974 | Fessenden | 33/149 R |
| 3,863,347 | 2/1975 | Banner | 33/457 |
| 4,388,759 | 6/1983 | Orejola | 33/149 R |

Primary Examiner—Willis Little
Attorney, Agent, or Firm—Seed and Berry

[57] ABSTRACT

A navigational instrument for measuring bearings and distances on maps comprising a first leg and a second leg. Each leg is transparent in part for convenient use while reading a map. Each leg, additionally, is tapered toward a lower end, defining a tip at each lower end. The first leg has an opening defining a channel for receiving a writing instrument which selectively can be positioned with the tip extending through the opening for writing or with the end opposite the tip protruding through the opening for storing the writing instrument. The first and second legs are pivotally coupled in the vicinity of the legs' upper ends and have a plurality of scales disposed about the pivotal coupling. One scale is used for measuring bearing. A second scale is used for measuring nautical miles on a Sectional Chart. A third scale is used for measuring nautical miles on a WAC chart.

22 Claims, 3 Drawing Figures

U.S. Patent   Jan. 26, 1988   4,720,921
FIG. 1
FIG. 2
FIG. 3
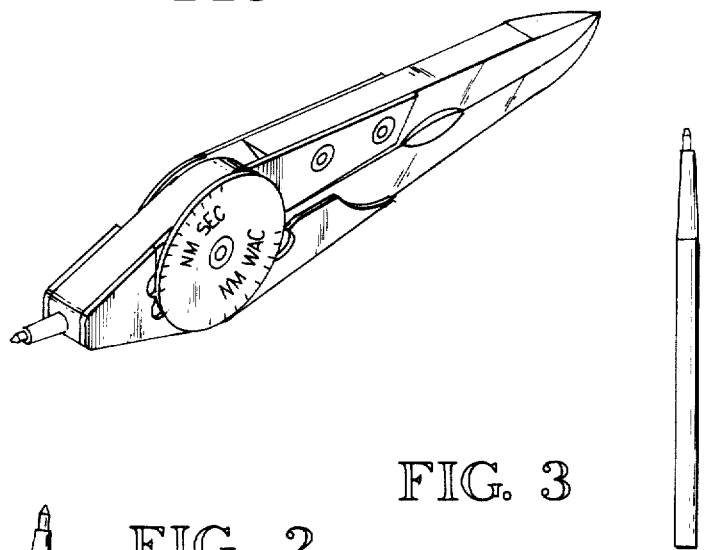
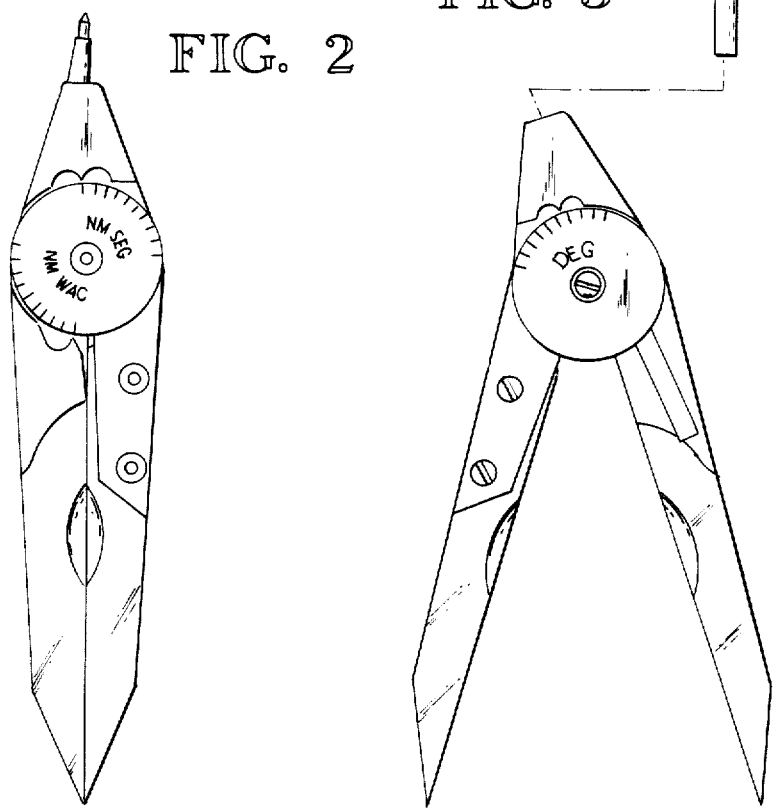

NAVIGATIONAL INSTRUMENT

DESCRIPTION

1. Technical Field

This invention relates to a navigational instrument, and more particularly, to a navigational instrument used for measuring bearings and distances on maps and charts.

2. Background Art

There are many map reading aids available to enable navigators to plot courses and measure distances. A simple set of dividers has been used to measure distances on a map by setting the distance between the legs of the divider equal to the map's key scale units, then deriving the distance from the number of divider lengths.

Protractors have been used to measure angles on a map for deriving a bearing. To measure an angle using a protractor, the current position, the destination, and the zero degree bearing line must be identified. The current position serves as the vertex of the angle to be formed by the zero degree bearing line and the line from the current position to the destination. The zero degree reference line is selected from the reference latitude or longitude lines on a map. The angle resulting is the bearing or the complementary or supplementary angle of the bearing, readily converted into the bearing.

A compass, normally used for drawing circles or arcs, can be used to combine both of these functions into one device. The compass can act as a divider because its legs frictionally rotate and can maintain a fixed distance apart. It also can measure a bearing because it has a scale in degrees which measures the angle between the two legs.

A standard compass, however, is an unsatisfactory tool for the navigator. When used like the dividers to measure linear distances, the pencil secured to one of the legs makes stray marks on the map. When laid flat to measure angles, it is difficult to find the vertex point of the compass and place it on the current position. If the compass does not have straight edges for the inside edges of each leg, then the zero degree bearing line and the current position to destination line will be difficult to identify and will lead to inaccurate measurement.

Improved measuring devices have been developed for the aviator. Because aviation maps have standard scales, the scale can be designed into the measuring device. The U.S. government publishes two commonly used map series: the World Aeronautical Chart (WAC) series, having standard distance scales in inches per statute mile and inches per nautical miles; and a Sectional Chart series, having differing standard distance scales in inches per statute miles and inches per nautical miles.

One device incorporating these scales consists of two legs secured at one end by a rivet and has various scales, including degrees, WAC nautical miles, and Sectional Chart statute miles. One problem with this device is that the zero degree bearing line and current position destination line used for measuring bearing are identified by aligning the map line with the lines running longitudinally down each leg. Holes in the leg are used to aid the alignment. Another problem is that it is opaque and blocks out portions of the map when measuring a bearing. One would continously have to move the device to check underneath to make sure the destination is aligned and to identify the landmarks and path to be traversed. Ideally, the pilot should have his attention diverted from the flight panel instruments and flight path for as short a time as possible when plotting a course or measuring distances on a map.

When plotting a course or measuring distances, the aviator often needs to write his measurements down and read them during later portions of the flights. Additionally, the aviator may need to change his course and adjust the allowances for wind speed and wind direction. As a result, a writing instrument should be conveniently located. A compass combines a writing instrument with a device for measuring angles, but has the problems referred to above. No device combining the distance scales, WAC Charts or Sectional Charts, and bearing measurement scales with a writing instrument is known.

DISCLOSURE OF INVENTION

It is an object of this invention to provide a convenient navigational instrument that can be used solely with one hand as a writing tool and a map distance measuring and bearing measuring tool.

It is another object of this invention to provide a navigational instrument that is transparent in part and minimizes obstruction of the use of the map portions covered by the legs.

These and other objects of the invention are accomplished by a navigation instrument comprising a first leg and a second leg, each leg transparent at least in part. Each leg is tapered toward the lower end and has an inside straight edge. The first leg defines a channel for frictionally receiving a writing instrument which is removably disposed, whereby either end of the writing instrument can selectively protrude from said channel. A pivot means couples the first and second legs in the vicinity of the upper ends. Three mensuration means (i.e., scales) are located about the pivot means. One measures distance in nautical mile units at a scale employed in WAC charts, a second measures distance in nautical mile units at a scale typically employed in Sectional Charts, and a third measures bearing in degrees or radians. In other embodiments, one or more of these mensuration means may be omitted or additional mensuration means may be added. The scale on any map could be the basis for preselectively calibrating a mensuration means to be disposed about the pivot means.

Further objects and advantages of the invention will become apparent from the following description, drawings, and appended claims.

BRIEF DESCRIPTION OF THE DRAWINGS

FIG. 1 is a perspective view of a preferred embodiment of the navigational instrument constructed according to the principles of the present invention.

FIG. 2 is an elevation of one side of the instrument.

FIG. 3 is an elevation of the side opposite that shown in FIG. 1.

BEST MODE FOR CARRYING OUT THE INVENTION

In the preferred embodiment, the navigational instrument comprises a writing instrument 1, a first leg 5, a second leg 6, a means 10 for pivotally connecting the two legs, and a series of scales 7, 8 and 11.

Referring to FIGS. 1, 2, and 3, the first leg 5 has a lower end 20, an upper end 17, and an inside straight edge 12, and is tapered at lower end 20. A channel 4 runs longitudinally downward from the upper end 17.

Writing instrument 1 is frictionally received by channel 4, normally having the writing tip 2 or the end opposite the writing tip 3 protrude from the channel 4. Preferably, the writing instrument 1 is a pen of the type capable of providing a constant supply of ink to the writing tip 2 at any attitude. In other embodiments, however, the writing instrument could be a pencil or other writing means. When the writing instrument 1 is fully inserted into the channel 4, the writing tip 2, as shown, protrudes enough to enable one to grab the open cartridge 1 with two fingers for pulling it from channel 4. An orifice 9 runs laterally through the first leg 5 from the outer surface to the lower portion of the channel 4 to allow air to pass through orifice 9 into channel 4 when removing or inserting the writing instrument 1. The first leg is tapered at the lower end 20.

A second leg 6 has a lower end 21, an upper end 22, and an inside straight edge 13. The second leg is tapered at the lower end 21. The means 10 for pivotally connecting the two legs is shown in this embodiment as a rivet, although suitable threaded fasteners may also be utilized.

The first leg and second leg, additionally, each have a depression along their inside straight edge. The pair of depressions are opposed depressions for conveniently adjusting with one hand the angle defined by the first and second leg.

One mensuration means 7 for measuring nautical miles on a Sectional Chart is shown in FIG. 2, along with another mensuration means 8 for measuring nautical miles on a WAC chart. A third mensuration means 11 is shown in FIG. 4 for measuring the angle in degrees formed between the straight edge 13 of first leg 5 and the straight edge 12 of second leg 6. In the preferred embodiment, each mensuration means comprises a plurality of inscriptions and an associated index 30. The indexes are fixedly attached to the second leg, while the plurality of inscriptions are disposed about the pivot means. The mensuration means for measuring bearing has its inscriptions spaced linearly to measure angles, whereas the mensuration means for measuring nautical miles on a WAC chart and the mensuration means for measuring nautical miles on a Sectional Chart are nonlinearly displaced so as to measure distance betweens the tips of each leg, not the angle.

In operation, the combination pen/navigational measurement device 25, for example, will measure nautical miles on a WAC chart. To accomplish this, the tip 16 of the first leg 5 is positioned on a source point of a WAC chart. The tip 18 of the second leg 6 is then positioned on a destination point of the chart by frictionally rotating second leg 6 about first leg 5 until the tip 18 can be positioned on the destination point. The distance in nautical miles between the source point and destination point is then read from the scale 8. The scale 8 is calibrated to one nautical mile equals 1/1,000,000 nautical mile between tip 16 and tip 18 and is based upon the standard scale used for WAC charts. Alternativelsy, scale 7 could be used to measure nautical miles based upon the scale one nautical mile equals 1/500,000 nautical mile between tip 16 and tip 18 for Sectional Charts.

To measure bearing when plotting a course, the navigational instrument 25 is laid flat on a map, whereby the degrees scale 11 is face up. The inside straight edge 13 is aligned with a reference line on the map to serve as a zero degree bearing line. The current position or source point is positioned at the vertex of the angle formed by straight edge 12 and straight edge 13. The straight edge 12 of the second leg 6 is then rotated about the first leg 5 until the destination point lies along the straight edge 12. The angle formed by the two edges 12 and 13 is then read from the scale 11. If the zero degree bearing reference line is the line for true North, then the angle read from the scale is the course bearing. Otherwise, the bearing must be calculated by offsetting the angle read from the scale from the reference line. For example, if the reference line is the 90° due East line, and the angle read was 40° above the reference line, the 40° is subtracted from 90 to derive the bearing of 50°.

The lower ends 20 and 21 of legs 5 and 6 are constructed from transparent plastic to allow the aviator to view the map while plotting the course. Additionally, pen 1, when inserted into channel 4 such that the writing tip 2 protrudes from the channel 4, can be used to quickly and conveniently write down the measurements, thereby requiring only one hand to take and record the measurements. For an aviator, this is convenient because the other hand will be free for flying the aircraft.

While the preferred embodiment of this invention has been shown and described, those skilled in the art will understand that numerous modifications, including alternative scales, may be made without departing from the scope of this invention. Therefore, this invention should not be limited to the preferred embodiment unless limitation is necessary in light of either the prior art or the scope and nature of the appended claims and their equivalents.

I claim:

1. A navigational instrument comprising:
    first and second legs, each transparent at least in part, each leg having an upper end and a tip defined by a lower end, each leg being tapered toward the lower end, said upper end of said first leg defining an opening to a channel disposed within said first leg for frictionally receiving a writing instrument;
    pivot means coupling said first and second legs in the vicinity of their upper ends; and
    a first mensuration means disposed about the pivot means preselectively calibrated for measuring distances on a map wherein the separation between said tip at the lower end of said first leg and said tip at the lower end of said second leg correlates to a reading on said first mensuration means.

2. The navigational instrument of claim 1, further comporising a writing instrument removably disposed in said channel, having a writing tip, whereby selectively either the writing tip or the end opposite the writing tip of the writing instrument can extend through said opening.

3. The navigational instrument of claim 2 wherein said writing instrument is a pen adapted to provide a constant supply of ink to the writing tip at any attitude.

4. The navigational instrument of claim 1 wherein said first mensuration means is calibrated for measuring distance at a scale of one nautical mile equals 1/500,000 nautical mile of separation between said tip at the lower end of said first leg end and said tip at the lower end of said second leg.

5. The navigational instrument of claim 4 wherein said first mensuration comprises a plurality of inscriptions and an index, said plurality of inscriptions disposed about said pivot means and said index fixed to one of said legs for indicating the nautical miles measured.

6. The navigational instrument of claim 1 wherein said first leg further defines an orifice extending from an outer surface of said first leg through to said channel of said first leg for allowing air to pass during insertion or extraction of said writing instrument from said channel.

7. The navigational instrument of claim 1, further comprising a second mensuration means and wherein said first and second legs each further define an inside straight edge, said second mensuration means for measuring the angle between said inside straight edge of said first leg and said insde straight edge of said second leg and disposed about said pivot means.

8. The navigational instrument of claim 7 wherein said second mensuration means comprises a plurality of inscriptions and an index, said plurality of inscriptions disposed about said pivot means and said index fixed to one of said legs for indicating the angle measured.

9. The navigational instrument of claim 7 wherein said first and second legs each further define a depression along the inside straight edge, said depressions opposed for adjusting the separation between said first leg and said second leg.

10. A navigational instrument comprising:
first and second legs, each transparent at least in part, each leg having an upper end and a tip defined by a lower end, each leg being tapered toward the lower end, said upper end of said first leg defining an opening to a channel disposed within said first leg for frictionally receiving a writing instrument;
a writing instrument removably disposed in said channel, having a writing tip, whereby selectively either the writing tip or the end opposite the writing tip of the writing instrument can extend through said opening;
pivot means coupling said first and second legs in the vicinity of their upper ends; and
a first mensuration means disposed about the pivotal means calibrated to measure nautical miles at a scale of one nautical mile equals 1/500,000 nautical mile of separation between said tip at the lower end of said first leg and said tip at the lower end of said second leg.

11. The navigational instrument of claim 10 wherein said first mensuration means comprises a plurality of inscriptions and an index, said plurality of inscriptions disposed about said pivot means and said index fixed to one of said legs for indicating the nautical miles measured.

12. The navigational instrument of claim 10 wherein said first leg further defines an orifice extending from an outer surface of said first leg through to said channel of said first leg for allowing air to pass during insertion or extraction of said writing instrument from said channel.

13. The navigational instrument of claim 10 wherein said writing instrument is a pen adapted to provide a constant supply of ink to the writing tip at any attitude.

14. The navigational instrument of claim 10, further comprising a second mensuration means and wherein said first and second legs each further define an inside straight edge, said second mensuration means for measuring the angle between said inside straight edge of said first leg and said inside straight edge of said second leg.

15. The navigational instrument of claim 14 wherein said second mensuration means comprises a plurality of inscriptions and an index, said plurality of inscriptions disposed about said pivot means and said index fixed to one of said legs for indicating the angle measured.

16. A navigational instrument comprising:
first and second legs, each transparent at least in part, each leg having an upper end and a tip defined by a lower end, each leg being tapered toward the lower end, said upper end of said first leg defining an opening to a channel for frictionally receiving a writing instrument, said channel disposed within said first leg
a writing instrument removably disposed in said channel, having a writing tip, whereby selectively either the writing tip or the end opposite the writing tip of the writing instrument can extend through said opening;
pivot means coupling said first and second legs in the vicinity of their upper ends;
a first mensuration means disposed about the pivot means calibrated to measure nautical miles at a scale of one nautical mile equals 1/500,000 nautical mile of separation between said tip at the lower end of said first leg and said tip at the lower end of said second leg; and
a second mensuration means disposed about the pivot means calibrated to measure nautical miles at a scale of one nautical mile equals 1/1,000,000 nautical mile of separation between said tip at the lower end of said second leg and said tip at the lower end of said third leg.

17. The navigational instrument of claim 16 wherein said first mensuration means comprises a plurality of inscriptions and an index, said plurality of inscriptions disposed about said pivot means and said index fixed to one of said legs for indicating the nautical miles measured.

18. The navigational instrument of claim 16 wherein said first leg further defines an orifice extending from an outer surface of said first leg through to said channel of said first leg for allowing air to pass during insertion or extraction of said writing instrument from said channel.

19. The navigational instrument of claim 16 wherein said writing instrument is a pen adapted to provide a constant supply of ink to the writing tip at any attitude.

20. The navigational instrument of claim 16, further comprising a third mensuration means and wherein said first and second legs each further define an inside straight edge, said third mensuration means for measuring the angle between said inside straight edge of said first leg and said inside straight edge of said second leg.

21. The navigational instrument of claim 20 wherein said second mensuration means comprises a plurality of inscriptions and an index, said plurality of inscriptions disposed about said pivot means and said index fixed to one of said legs for indicating the angle measured.

22. A navigational instrument comprising:
first and second legs, each transparent at least in part and each leg having an upper end, a lower end, and a tip defined by said lower end, each leg being tapered toward the lower end, said first leg defining an opening to a channel disposed within said first leg for frictionally receiving a writing instrument, said first leg further defining an orifice extending from an outer surface of said first leg through to said channel of said first leg for allowing air to pass during insertion or extraction of said writing instrument from said channel;
a writing instrument removably disposed in said channel, said instrument having a writing tip, whereby selectively either the writing tip or the end opposite the writing tip can extend through said channel;

a pivot means for coupling first and second legs in the vicinity of their upper ends;

a first mensuration means comprising a plurality of inscriptions and an index, said plurality of inscriptions disposed about said pivot means, said index fixed to one of said legs for measuring nautical miles at a scale of one nautical mile equals 1/500,000 nautical mile of separation between said tip at the lower end of said first leg and said tip at the lower end of said second leg;

a second mensuration means comprising a plurality of inscriptions and an index, said plurality of inscriptions disposed about said pivot means, said index fixed to one of said legs for measuring nautical miles at a scale of one nautical mile equals 1/1,000,000 nautical mile of separation between the tip at the lower end of said first leg and the tip at the lower end of said second leg; and a third mensuration means comprising a pluraity of inscriptions and an index, said plurality of inscriptions disposed about said pivot means, said index fixed to one of said legs for measuring the angle between said straight edge of said first leg and said straight edge of said second leg.

* * * * *

UNITED STATES PATENT AND TRADEMARK OFFICE
CERTIFICATE OF CORRECTION

PATENT NO. : 4,720,921

DATED : January 26, 1988

INVENTOR(S) : Eugene N. Beaudry

It is certified that error appears in the above—identified patent and that said Letters Patent is hereby corrected as shown below:

In Claim 5, line 2 add --means-- before the word "comprises".

Claim 7, line 6 delete "insde" and substitute therefor --inside--.

Claim 22, line 36 delete "pluraity" and substitute therefor --plurality--.

Signed and Sealed this

Fourteenth Day of June, 1988

Attest:

DONALD J. QUIGG

*Attesting Officer*  *Commissioner of Patents and Trademarks*